United States Patent [19]

Schopfer

[11] Patent Number: 5,249,226
[45] Date of Patent: Sep. 28, 1993

[54] APPARATUS FOR CONTROLLING A CURRENT SUPPLY DEVICE

[75] Inventor: Walter S. Schopfer, Austin, Tex.

[73] Assignee: Advanced Micro Devices, Inc., Sunnyvale, Calif.

[21] Appl. No.: 844,482

[22] Filed: Mar. 2, 1992

[51] Int. Cl.$^5$ .............................................. H04M 9/08
[52] U.S. Cl. ................................... 379/413; 379/400
[58] Field of Search ............... 379/400, 413, 401, 324, 379/412

[56] References Cited

U.S. PATENT DOCUMENTS

| | | | |
|---|---|---|---|
| 3,639,696 | 2/1972 | Chambers, Jr. | 379/401 |
| 4,061,883 | 12/1977 | Chambers, Jr. | 379/401 |
| 4,419,542 | 12/1983 | Embree et al. | 379/413 X |
| 4,488,006 | 12/1984 | Essig et al. | 379/413 X |
| 4,677,669 | 6/1987 | Kawami et al. | 379/413 |
| 4,935,960 | 6/1990 | Takato et al. | 379/324 X |
| 4,961,220 | 10/1990 | Tentler et al. | 379/413 |

Primary Examiner—James L. Dwyer
Assistant Examiner—Creighton Smith
Attorney, Agent, or Firm—Foley & Lardner

[57] ABSTRACT

An apparatus for controlling a supply current to a load, such as a telephone subscriber line, generates an output current responsive to the changes in the load according to a predetermined response profile, which is defined by a plurality of parameters and includes a first range extending from a lower load level to higher load level, and a second range extending above the higher load level. A first control circuit generates a first set of parameters establishing the response profile within the first range; a second control circuit generates a second set of parameters establishing the response profile within the second range; and an apportionate feed circuit apportions signals within the apparatus. The first control circuit receives a load indicating current and first reference current, establishes the lower load level, and cooperates with the apportionate feed circuit to impose a first set of the operational parameters in generating an output current within the first range. The second control circuit receives a load indicating current and a second reference current; establishes the higher load level; and cooperates with the first control circuit and the apportionate feed circuit to impose a second set of the operational parameters in generating the output current within the second range. At least one of the parameters is generated having a plurality of values presented at a plurality of nodes. Each of the nodes is programmably selectable for employment by the apparatus.

7 Claims, 5 Drawing Sheets

APPARATUS FOR CONTROLLING A CURRENT SUPPLY DEVICE

BACKGROUND OF THE INVENTION

The present invention is directed to an apparatus for controlling a current supply device which provides a supply current to a load. More specifically, the present invention is directed to an apparatus for controlling a current supply device which provides a supply current to a subscriber line in a telephone system.

It is desirable that a customer (such as a telephone operating company, a supplier of central office switching equipment or a supplier of private branch office exchange telephone equipment) be able to control and establish particular parameters in equipment supplying feed current to a loop such as a subscriber line associated with a telephone system. In particular, such parameters as feed resistance and limiting current, and the parameters establishing an anti-saturation region in the response of the system to varying loads on the subscriber line must be imposed appropriately to enable transmission of signals without distortion.

Prior art technology can effect such parameter setting, but a change of parameters requires a new mask for chip manufacture for each adjustment of a parameter. Thus, any parameter change must occur during chip manufacture, and no selection, or programmability capability is available to a user.

To provide such a programmable selection capability for the required parameters using prior art technology necessitates the employment of on-chip resistors to adjust the direct current (DC) parameters normally associated with subscriber line circuits. Such on-chip resistors in, for example, CMOS technology occupy a significant amount of space on the chip substrate, commonly called "real estate". The high values of resistance required to set the appropriate parameters for a subscriber loop, and their high real estate occupancy, militate against the provision of a bank of resistors which can be selected by software control to provide the desired programmability for customer customization of a chip to a particular telephone installation.

There is a need for a control circuit for controlling a current supply device for providing a supply current to a load in a telephone subscriber line which is compact and enables a user to employ software programming to select appropriate parameters without requiring a new mask for each change in parameter value. It is especially desirable that such a control circuit be implementable using CMOS technology.

SUMMARY OF THE INVENTION

The invention is an apparatus for controlling a current supply device which provides a supply current to a load, such as a subscriber line in a telephone installation. The apparatus receives a load indicating current from the load which indicates changes in the load voltage and generates an output current responsive to the changes in the load voltage according to a predetermined response profile. The response profile is defined by a plurality of operational parameters and includes a first range extending from a lower load level to higher load level and a second range extending above the higher load level.

The apparatus comprises a first control circuit for generating a first set of operational parameters which establishes the response profile within the first range; a second control circuit for generating a second set of operational parameters which establishes the response profile within the second range; and an apportionate feed circuit for apportioning signals within the apparatus. The apportionate feed circuit is operatively connected with an output terminal by which an output current is generated by the apparatus. The first control circuit and the second control circuit are each operatively connected to receive the load indicating current and operatively connected with the apportionate feed circuit. The first control circuit receives a first reference current from a first reference current source and establishes the lower load level. The first control circuit and the apportionate feed circuit cooperate to impose the first set of operational parameters in generating the output current within the first range. The second control circuit receives a second reference current from a second current source and establishes the higher load level. The second control circuit, the first control circuit, and the apportionate feed circuit cooperate to impose the second set of operational parameters in generating the output current within the second range. At least one of the plurality of operational parameters generated by the apparatus is generated having a plurality of values presented at a plurality of nodes, each of the plurality of nodes being programmably selectable for employment by the apparatus.

In its preferred embodiment, each of the first control circuit, the second control circuit, and the apportionate feed circuit are configured as current mirror circuits having a plurality of output sub-circuits which are configured to enable a user to selectively establish parameters imposed by the apparatus during its operation.

It is therefore an advantage of the present invention to provide an apparatus for controlling a current supply device for providing a supply current to a load which compactly provides a programmable selection capability for choosing among a plurality of operational parameters to be employed by the apparatus.

It is a further advantage of the present invention to provide an apparatus for controlling a current supply device for providing a supply current to a load which is implemented using CMOS technology to provide a programmable selection capability for choosing operational parameters.

Further objects and features of the present invention will be apparent from the following specification and claims when considered in connection with the accompanying drawings illustrating the preferred embodiment of the invention.

DETAILED DESCRIPTION OF THE INVENTION

Figure 1:
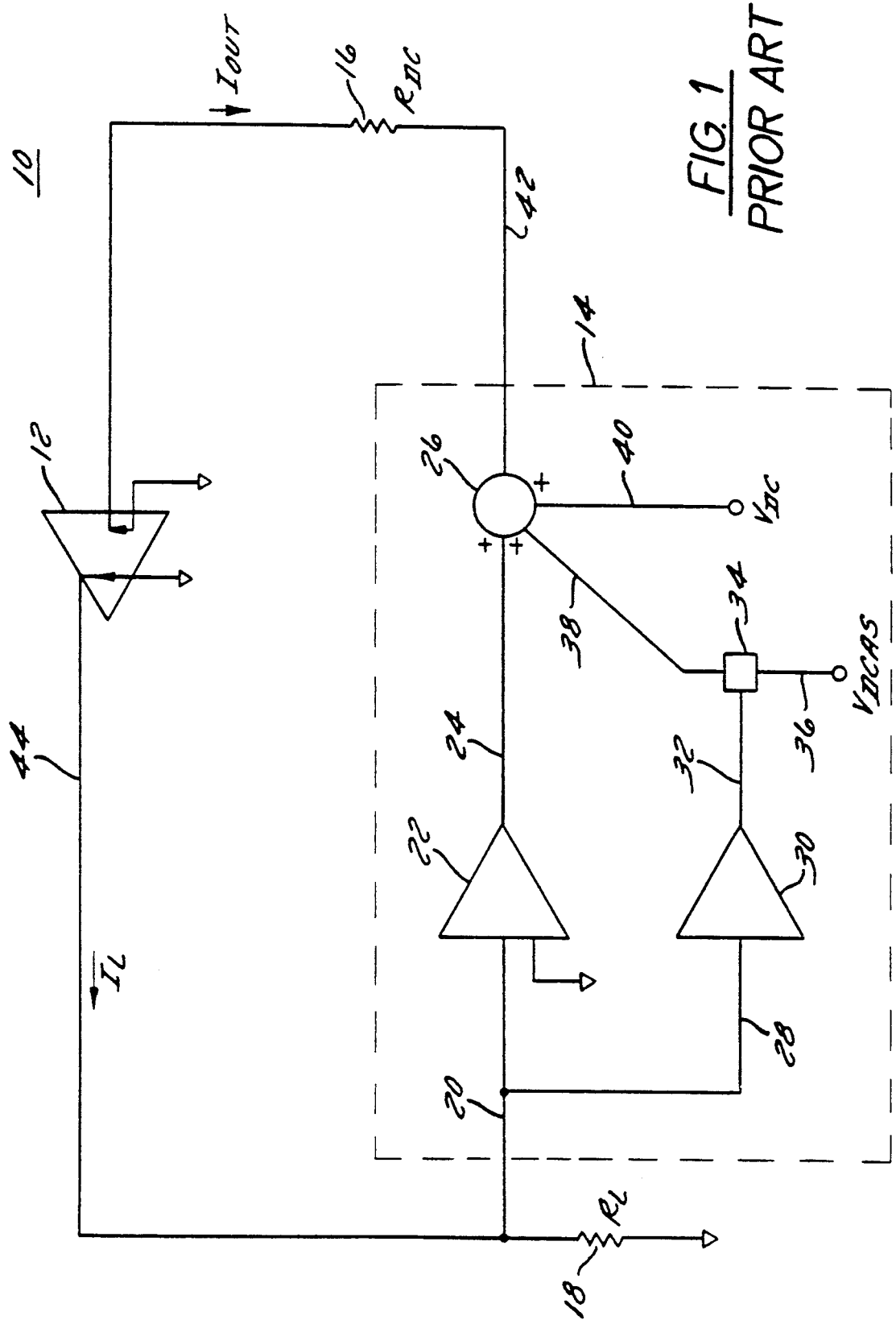
FIG. 1 is a schematic drawing illustrating a prior art current supply device for providing a supply current to a load.

FIG. 1 is a schematic diagram of a prior art current supply device particularly useful for supplying DC current to a telephone subscriber line. In FIG. 1, a current supply device 10 includes a current amplifier 12, a feed control circuit 14, and a feed resistor 16 connected to a subscriber line load represented by a subscriber line load resistor 18.

Feed control circuit 14 receives the voltage across subscriber line load resistor 18 via a line 20 and applies the voltage on line 20 to a voltage amplifier 22. Voltage amplifier 22 provides a voltage signal on an output line 24 to a summing node 26. The voltage signal conveyed via line 20 is also conveyed via a line 28 to an input of a voltage amplifier 30. Voltage amplifier 30 provides a voltage signal on an output line 32 to a comparison circuit 34. Comparison circuit 34 receives a reference voltage $v_{DCAS}$ via a line 36. When the voltage signal conveyed via line 32 is greater than reference voltage $v_{DCAS}$ comparison circuit 34 applies a voltage signal to summing node 26 via a line 38. When the voltage signal conveyed via line 32 is less than $v_{DCAS}$, no signal is conveyed to summing node 26 via line 38. Also applied to summing node 26 is a reference voltage $v_{DC}$ via a line 40. A resulting voltage signal is conveyed from summing node 26 via a line 42 through feed resistor 16 to establish an output current $I_{OUT}$. Feed resistor 16 has a value of $R_{DC}$. Output current $I_{OUT}$ is amplified by current amplifier 12 to generate feed current $I_L$ for provision to subscriber line load represented by resistor 18 having a value of $R_L$.

Current supply device 10, therefore, establishes the response profile illustrated in FIG. 2, as will be described hereinafter.

Figure 2:
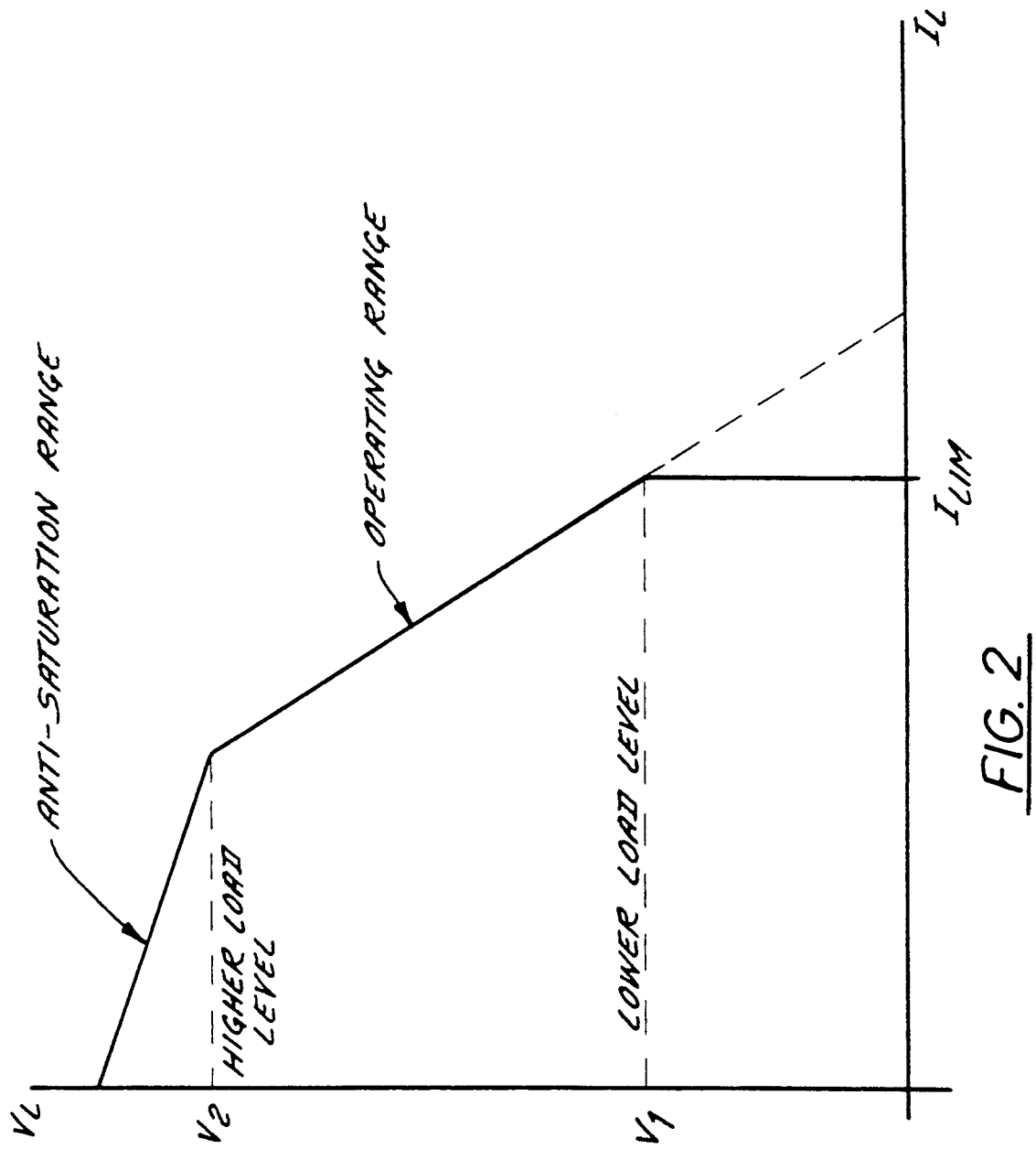
FIG. 2 is a graphic representation of a response profile associated with providing a supply current to a load.

FIG. 2 is a graphic representation of a response profile associated with providing a supply current to a load. In FIG. 2, a response of load current ($I_L$) in a subscriber circuit with respect to variations in load voltage ($v_L$) across a load ($R_L$) in the subscriber line circuit is plotted on an x-y coordinate.

Considering FIGS. 1 and 2 together, a lower load level $v_1$ (FIG. 2) is set by the resulting voltage signal from summing node 26 conveyed via line 42 through feed resistor 16 establishing output current $I_{OUT}$. Output current $I_{OUT}$ is amplified by current amplifier 12 to produce feed current $I_L$. Feed current $I_L$ is conveyed via line 44 to subscriber line load resistor 18. Reference voltage $v_{DC}$ establishes a lower load level $v_1$ for current supply device 10. The presence of reference voltage $v_{DC}$ as an input to summing node 26 ensures that if load $R_L$ approaches zero, there always will be a minimum current flowing to current amplifier 12 established by the relationship $V_{DC}/R_{DC}$. In such manner, the limiting current $I_{LIM}$ illustrated in FIG. 2 is established.

A higher load level $v_2$ (FIG. 2) is established by the interaction of signals conveyed via line 32 and line 36 to comparison circuit 34 (FIG. 1) and the operation of comparison circuit 34 in providing a signal to summing node 26 via line 38 when signals on line 32 exceed $v_{DCAS}$. The injection of an additional signal to summing node 26 via line 38 in such circumstances results in a change of gain of feed control circuit 14 and, consequently, current supply device 10 so that the slope of the response current represented by FIG. 2 is changed in the region above higher load level $v_2$. The area in FIG. 2 above higher load level $v_2$ is an anti-saturation range, and the change of slope effected by feed control circuit 14 above higher load level $v_2$ ensures that load levels above higher load level $v_2$ will not result in saturation of current amplifier 12 and feed control circuit 14.

Feed control circuit 14 (FIG. 1) is, therefore, a voltage-based circuit which supplies a current to current amplifier 12 by virtue of the voltage signal output from summing node 26 being applied via line 42 to feed resistor 16. In order to change any parameters contributing to the response profile illustrated in FIG. 2, such as lower load level $v_1$, higher load level $v_2$, the slope of the response profile in the operating range between lower load level $v_1$ and higher load level $v_2$, or the slope of the response profile within the anti-saturation range above higher load level $v_2$, one employing the prior art current supply device 10 of FIG. 1 must vary reference voltage $v_{DC}$ and the value $R_{DC}$ of feed resistor 16. Additionally, the gain of one or both of voltage amplifier 22 and voltage amplifier 30 may be altered to vary the slope of the response profile. Varying the gain of voltage amplifiers or the value of a resistor is not easily implemented in a manner allowing software selection of values from among a plurality of values, commonly known as providing a programmable capability for a device such as current supply device 10. The load values (i.e., resistance values) required for the current levels desired necessitate an unacceptably large amount of real estate occupancy by resistor elements on a chip when such a capability is implemented in CMOS technology.

It is desirable to provide a user with a programmable capability within a chip. The economics of such an approach are well-known in the industry: by providing such a capability, a manufacturer of a chip can manufacture a single chip which can be applicable to a wider variety of subscriber line conditions. Such single-chip manufacturing operations eliminate the requirements for multiple-chip manufacturing and thus eliminate additional inventory, lost time in tooling changes and set-ups, and other expenses associated with changing from manufacturing one product to manufacturing another product.

Figure 3:
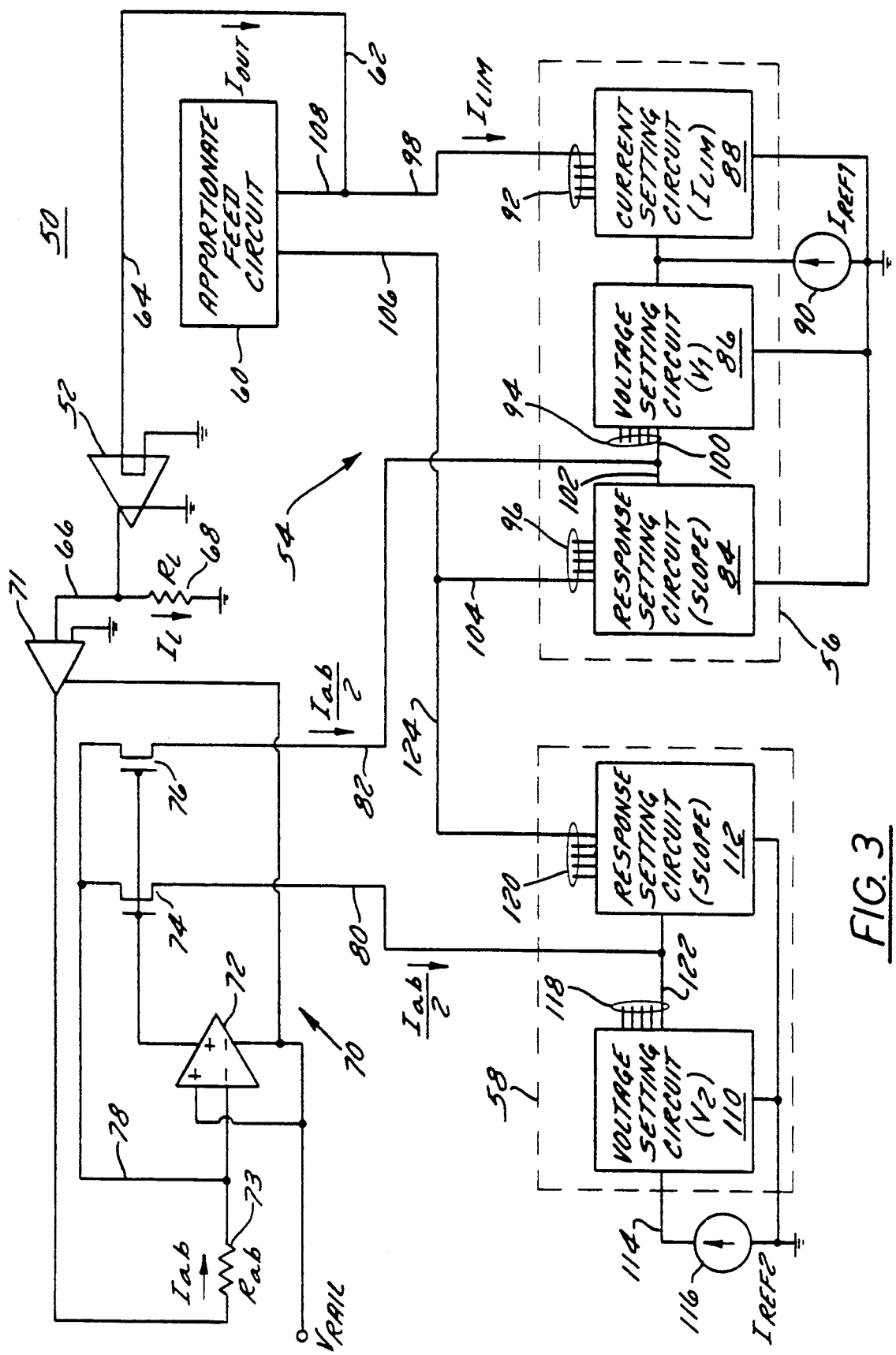
FIG. 3 is a schematic block diagram illustrating the preferred embodiment of the present invention.

FIG. 3 is a schematic block diagram illustrating the preferred embodiment of the present invention. In FIG. 3, a current supply device 50 is illustrated including a current amplifier 52 and a feed control circuit 54. Feed control circuit 54 comprises a first control circuit 56, a second control circuit 58, and an apportionate feed circuit 60. Feed control circuit 54 generates an output current $I_{OUT}$ at an output terminal 62, and output current $I_{OUT}$ is delivered to current amplifier 52 from output terminal 62 via a line 64. Output current $I_{OUT}$ is amplified by current amplifier 52 and delivered via a line 66 to a subscriber line circuit, represented by a resistor 68 having a value of resistance $R_L$.

Current supply device 50 receives the voltage across subscriber line load resistor 68 via a current distribution circuit 70. Current distribution circuit 70 includes an input buffer 71, an operational amplifier 72 to which is applied a reference voltage $v_{RAIL}$ (preferably approximately +2.5 volts), and field effect transistors (FETs) 74, 76. A current $I_{ab}$ representative of load current $I_L$ is established by a voltage potential across a bias resistor 73 having a value $R_{ab}$. Load representative current $I_{ab}$ is applied to operational amplifier 72 and is also applied via a line 78 to FETs 74, 76 so that current distribution circuit 70 delivers a load indicating current $I_{ab}/2$ to feed control circuit 54 via lines 80, 82.

First control circuit 56 is comprised of a response setting circuit 84, a voltage setting circuit 86, and a current setting circuit 88. A first reference current $I_{REF1}$ is provided to first control circuit 56 from a current source 90 and is received by voltage setting circuit 86 and by current setting circuit 88. Current setting circuit 88 has a plurality of output terminals 92; voltage setting circuit 86 has a plurality of output terminals 94; and response setting circuit 84 has a plurality of output terminals 96. Current setting circuit 88 generates an output current $I_{LIM}$ at a selected output terminal 92 in response to first reference current $I_{REF1}$. Limiting current $I_{LIM}$ is the current supplied by current supply device 50 for any load voltages less than lower load level $v_1$ in FIG. 2 (presuming a unity gain by current amplifier 52). If current amplifier 52 has other than a unity gain, then limiting current $I_{LIM}$ (FIG. 3) will be of an appropriate value for amplification by current amplifier 52 to result in an output on line 66 equal to limiting current $I_{LIM}$ for load values of lower load level $v_1$ or less.

Current setting circuit 88 is configured to enable a user to designate any of output terminals 92 (or any combination of output terminals 92) for involvement in generation of limiting current $I_{LIM}$ on a line 98.

Voltage setting circuit 86 generates an output current at one or more of its output terminals 94 in response to first reference current $I_{REF1}$. Voltage setting circuit 86 is configured to enable a user to programmably select one or more output terminals 94 for involvement in delivering a current output from voltage setting circuit 86 to a line 100. Line 100 is connected with line 82 so that the current output from voltage setting circuit 86 runs counter to the load indicating current carried on line 82. When load indicating current $I_{ab}/2$ is greater than the output current from voltage setting circuit 86 carried on line 100, then a current may flow on line 102 resulting in response setting circuit 84 drawing additional current from apportionate feed circuit 60 via a line 104 and a line 106. The resulting added current draw from apportionate feed circuit 60 induces an additional current draw by apportionate feed circuit 60 on line 108, which results in a lowering of output current $I_{OUT}$ from limiting current $I_{LIM}$ provided on line 98 from current setting circuit 88. Increased current flow to response setting circuit 84 via a line 102 (which results from a greater positive differential between $I_{ab}/2$ on line 82 and the output current on line 100 from voltage setting circuit 86) results in response setting circuit 84 drawing a greater current via lines 106 and 104 from apportionate feed circuit 60, which in turn induces a greater current draw by apportionate feed circuit 60 on line 108. Such an increased current draw by apportionate feed circuit 60 further reduces output current $I_{OUT}$ at output terminal 62 from limiting current $I_{LIM}$ appearing on line 98. One or more of output terminals 96 of response setting circuit 84 may be selected by a user to give a user programmable choices as to the slope of the response profile in the operating range intermediate lower load level $v_1$ and higher load level $v_2$ (FIG. 2).

Second control circuit 58 is comprised of a voltage setting circuit 110 and a response setting circuit 112. A second reference current $I_{REF2}$ is received by voltage setting circuit 110 via a line 114 from a current source 116. Voltage setting circuit 110 has a plurality of output terminals 118 and response setting circuit 112 has a plurality of output terminals 120.

Voltage setting circuit 110 generates an output current on a line 122 in response to reference current $I_{REF2}$. One or more of output terminals 118 may be programmably selected by a user for involvement in delivering an output current from voltage setting circuit 110 to line 122. Line 122 is connected with line 80 so that load indicating current $I_{ab}/2$ and the output current from voltage setting circuit 110 appearing on line 122 run counter to each other. Accordingly, when load indicating current $I_{ab}/2$ exceeds the output current for voltage setting circuit 110 appearing on line 122, then response setting circuit 112 draws yet additional current from apportionate feed circuit 60 via lines 124, 106. Such additional draw of current from apportionate feed circuit 60 causes apportionate feed circuit 60 to draw additional current on line 108, thereby further reducing output current $I_{OUT}$ at output terminal 62 below limiting current $I_{LIM}$ appearing on line 98. One or more of output terminals 120 may be designated by a user for participation in drawing current from apportionate feed circuit 60 via lines 124, 106, thereby allowing a user to programmably select the slope of the response profile in the anti-saturation range above higher load level $v_2$ (FIG. 2).

Thus, all parameters of the response profile illustrated in FIG. 2 may be programmably selected for provision by current supply device 50: current setting circuit 88 sets limiting current $I_{LIM}$, voltage setting circuit 86 sets lower load level $v_1$, response setting circuit 84 sets the slope of the response profile in the operating range; voltage setting circuit 110 sets higher load level $v_2$; and response setting circuit 112 sets the slope of the response profile in the anti-saturation range.

Figure 4:
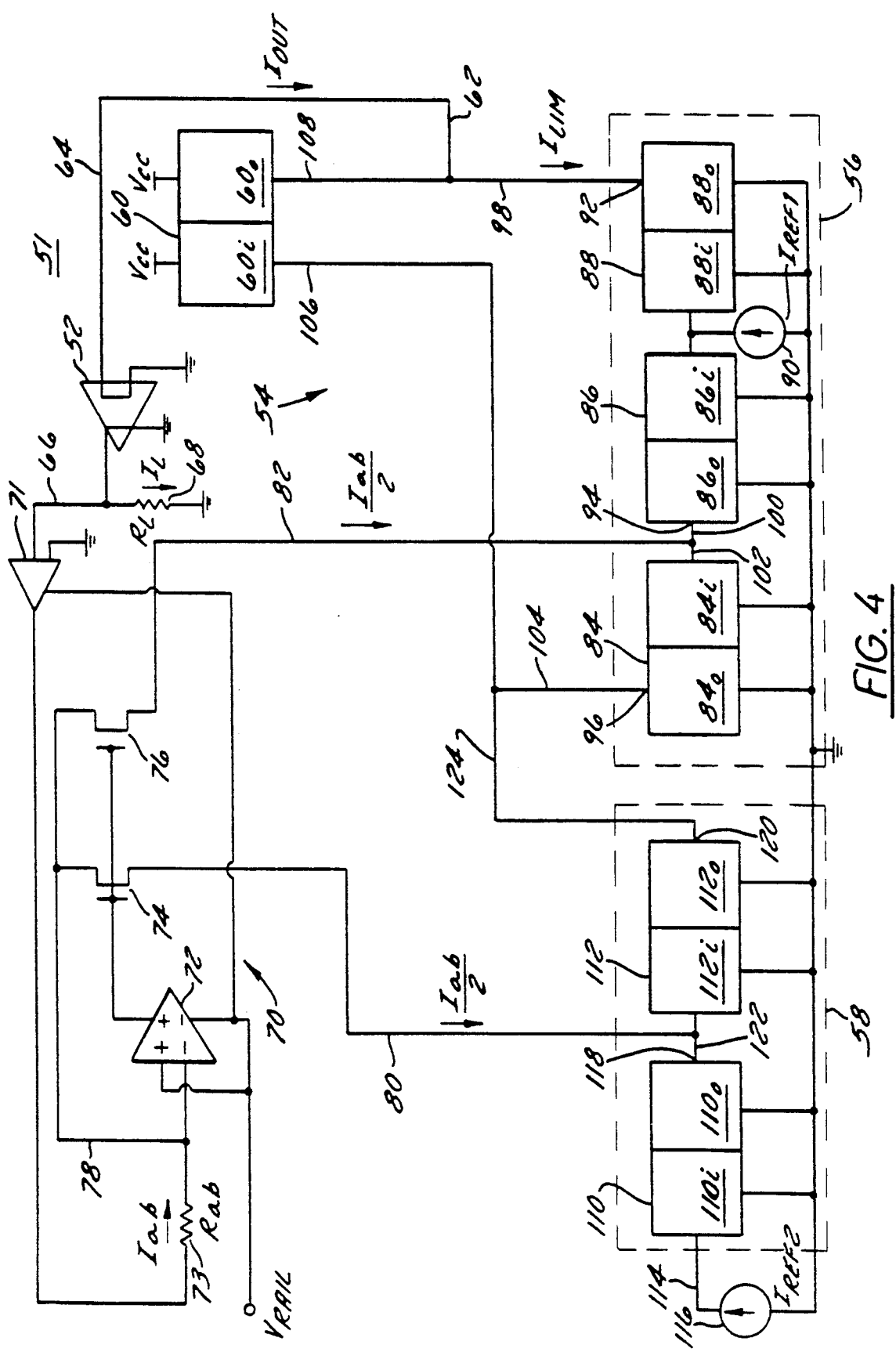
FIG. 4 is a detailed schematic block diagram illustrating the preferred embodiment of the present invention.

FIG. 4 is a detailed schematic block diagram illustrating the preferred embodiment of the present invention. In order to facilitate understanding the invention, like elements are identified by like reference numerals in FIGS. 3 and 4. FIG. 4 illustrates a current supply device 51 including a first control circuit 56, a second control circuit 58, and an apportionate feed circuit 60, schematically indicating that each of those circuits 56, 58, 60 is comprised of one or more current mirror circuits. Accordingly, current setting circuit 88 is comprised of a current mirror circuit having an input cell $88_i$ and an output cell $88_o$, voltage setting circuit 86 comprises a current mirror circuit having an input cell $86_i$ and an output cell $86_o$, response setting circuit 84 is comprised of a current mirror circuit having an input cell $84_i$ and an output cell $84_o$, voltage setting circuit 110 is comprised of a current mirror circuit having an input cell $110_i$ and an output cell $110_o$, response setting circuit 112 is comprised of a current mirror circuit having an input cell $112_i$ and an output cell $112_o$, and apportionate feed circuit 60 is comprised of a current mirror circuit having an input cell $60_i$ and an output cell $60_o$.

Current setting circuit 88 receives first reference current $I_{REF1}$ from current source 90 at its input cell $88_i$ and generates limiting current $I_{LIM}$ from output cell $88_o$ via output terminal 92. Output terminal 92 is indicated as a single terminal in FIG. 4 because selection among various outputs generatable by output cell $88_o$ is made internally in output cell $88_o$. Voltage setting circuit 86 receives first reference current $I_{REF1}$ at its input cell $86_i$ and generates an output current from output cell $86_o$ at output terminal 94. Output terminal 94 is indicated as a single terminal because selection among the various outputs generatable by output cell $86_o$ occurs internally in output cell $86_o$. Response setting circuit 84 responds to the difference between load indicating current $I_{ab}/2$ on line 82 and the output current from output cell $86_o$ of voltage setting circuit 86 to establish a current draw via lines 104, 106 from input cell $60_i$ of apportionate feed circuit 60 through output terminal 96 of output cell $84_o$. Output terminal 96 is indicated as a single terminal because selection among the various output terminals available for response setting circuit 84 occurs internally in output cell $84_o$.

Voltage setting circuit 110 receives second reference current $I_{REF2}$ from current source 116 via line 114 by its input cell $110_i$ and generates an output current on line 122 via output terminal 118 through output cell $110_o$. Output terminal 118 is illustrated in FIG. 4 as a single terminal since selection among the various outputs generatable by output cell $110_o$ occurs internally in output cell $110_o$. Response setting circuit 112 responds to the difference between load indicating current $I_{ab}/2$ on line 80 and the output current from output cell $110_o$ of voltage setting circuit 110 on line 122 to increase current draw via lines 124, 106 from apportionate feed circuit 60 via output terminal 120 through output cell $112_o$. Output terminal 120 is indicated in FIG. 4 as a single output terminal since selection among the various outputs generatable by output cell $112_o$ occurs internally in output cell $112_o$.

Apportionate feed circuit 60 experiences variant current draw through its input cell $60_i$ as determined by output cell $84_o$ of response setting circuit 84 and output cell $112_o$ of response setting circuit 112. The variant current draw through input cell $60_o$ causes increased current draw through output cell $60_o$, thereby subtractively affecting limiting current $I_{LIM}$ on line 98 in determining output current $I_{OUT}$ through output terminal 62, as previously described in connection with FIG. 3.

Figure 5:
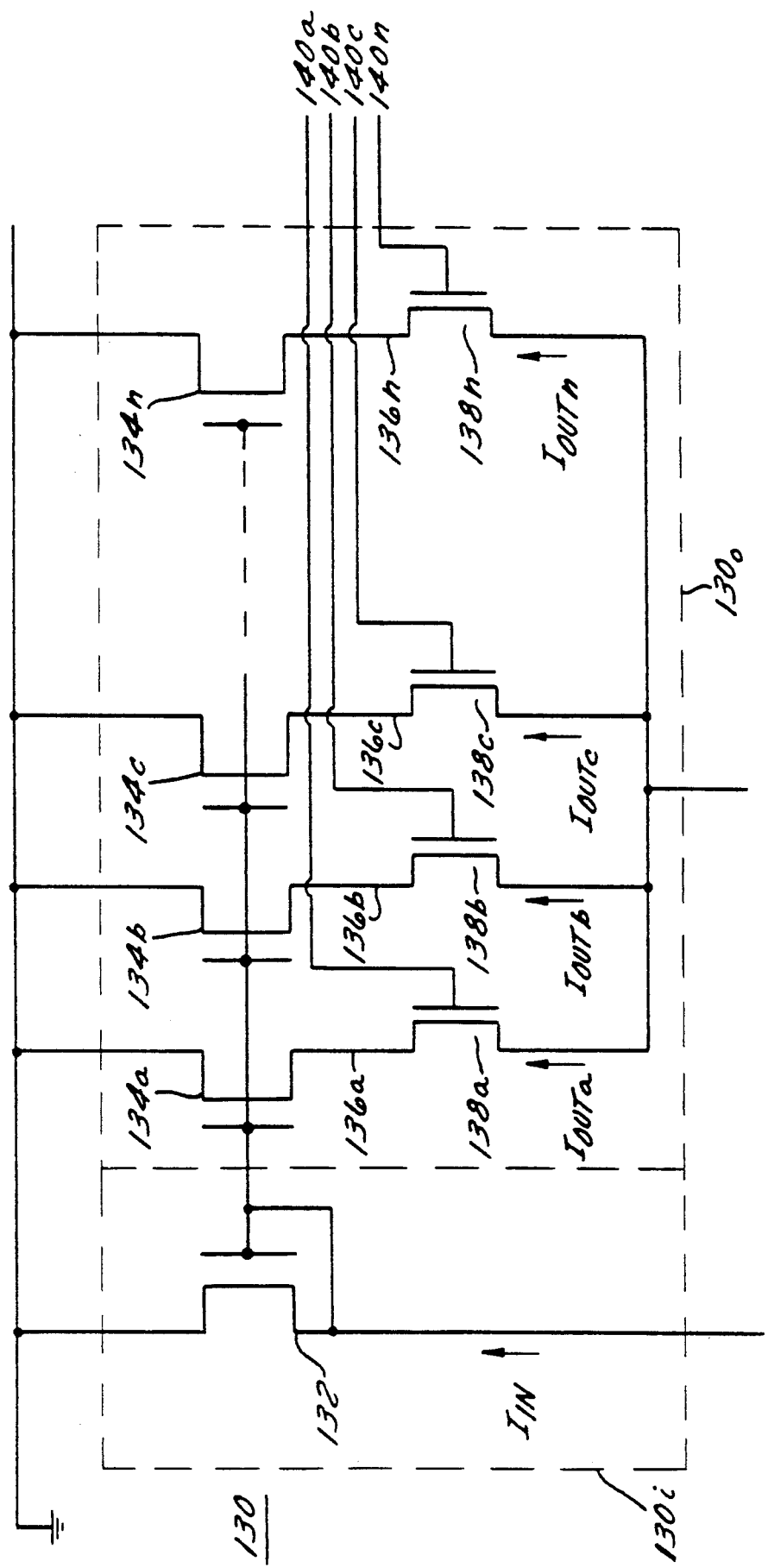
FIG. 5 is a schematic diagram illustrating the structure of a current mirror circuit employed in the preferred embodiment of the present invention.

FIG. 5 is a schematic diagram illustrating the structure of a current mirror circuit employed in the preferred embodiment of the present invention. In FIG. 5, a representative current mirror circuit 130 appropriate for employment in any of the current mirror circuits 84, 86, 88, 110 and 112 of FIG. 4 is illustrated as it would be implemented in CMOS technology. Current mirror 60 is a p-channel device having a configuration similar to the circuit illustrated in FIG. 5. Current mirror circuit 130 is comprised of an input cell $130_i$ and an output cell $130_o$. Input cell $130_i$ is comprised of a field effect transistor (FET) 132. Output cell $130_o$ comprises a plurality of output FETs $134_a$, $134_b$, $134_c$, ... $134_n$. A terminal $136_a$ of output FET $134_a$ is switched by a CMOS switch $138_a$, which is controlled by a gating line $140_a$ so that an appropriate signal applied to gating line $140_a$ will enable output current $I_{out}$ to enter output FET $134_1$ via terminal $136_a$. Similarly, each output FET $134_b$, $134_c$, ..., $134_n$ has a respective terminal $136_b$, $136_c$, ..., $136_n$ controlled by a respective CMOS switch $138_b$, $138_c$, ..., $138_n$. Further, each respective CMOS switch 138 has a respective gating line 140 so that selectively applying appropriate signals to respective gating lines 140 enables selection of any of terminals 136 for providing an output signal for its respective output FET 134.

Each output current $I_{OUT}$, mirrored by a respective output FET 134, is related to an input current $I_{IN}$ according to the ratio of widths of input FET 132 and respective output FET 134. Thus, by varying the widths among the various output FET 134, a variety of output currents $I_{OUT}$ may be provided.

It is to be understood that, while the detailed drawing and specific examples given describe preferred embodiments of the invention, they are for the purpose of illustration, that the apparatus of the invention is not limited to the precise details and conditions disclosed and that various changes may be made therein without departing from the spirit of the invention which is defined by the following claims:

What is claimed is:

1. An apparatus for controlling a current supply device for providing a supply current to a load; the apparatus receiving a load current from said load, said load current indicating changes in said load, the apparatus generating an output current responsive to said changes according to a predetermined response profile; said response profile including a first range extending from a lower load level to a higher load level and a second range extending above said higher load level; said response profile being defined by a plurality of operational parameters; the apparatus comprising:

a first control circuit means for generating a first set of operational parameters of said plurality of operational parameters; said first set of operational parameters establishing said response profile within said first range;

a second control circuit means for generating a second set of operational parameters of said plurality of operational parameters; said second set of operational parameters establishing said response profile within said second range; and an apportionate feed circuit means for apportioning signals within the apparatus, said apportionate feed circuit means being operatively connected with an output terminal, said output current being generated at said output terminal;

said first control circuit means and said second control circuit means each being operatively connected to receive said load current and operatively connected with said apportionate feed circuit means;

said first control circuit means receiving a first reference current from a first current source and establishing said lower load level, said first control circuit means and said apportionate feed circuit means cooperating to impose said first set of operational parameters in generating said output current within said first range;

said second control circuit means receiving a second reference current from a second current source and establishing said higher load level, said second control circuit means, said first control circuit means, and said apportionate feed circuit means cooperating to impose said second set of operational parameters in generating said output current within said second range;

at least one of said plurality of operational parameters being generated having a plurality of values at a plurality of nodes, each of said plurality of nodes being programmably selectable for employment by the apparatus.

2. An apparatus for controlling a current supply device for providing a supply current to a load as recited in claim 1 wherein said first circuit control means further generates a limiting output current at said output terminal, said limiting output current being provided as said output current when said load is at or below said lower load level.

3. An apparatus for controlling a current supply device for providing a supply current to a load as recited in claim 1 wherein said first control circuit means, said second control circuit means, and said apportionate feed circuit means each comprises at least one current mirror circuit.

4. An apparatus for controlling a current supply device for providing a supply current to a load as recited in claim 2 wherein said first control circuit means, said second control circuit means, and said apportionate feed circuit means each comprises at least one current mirror circuit.

5. An apparatus for controlling a current supply device for providing a supply current to a load as recited in claim 2 wherein said first control circuit means comprises a first voltage setting current mirror circuit, a first response setting current mirror circuit, and a current setting current mirror circuit; said first voltage setting current mirror circuit establishing said lower load level in response to said first reference current; said first response setting current mirror circuit cooperating with said apportionate feed circuit means to establish a response of said output current to said load current within said first range; said current setting current mirror circuit establishing said limiting output current in response to said first reference current.

6. An apparatus for controlling a current supply device for providing a supply current to a load as recited in claim 2 wherein said second control circuit means comprises a second voltage setting current mirror circuit and a second response setting current mirror circuit; said second voltage setting current mirror circuit establishing said higher load level in response to said second reference current; said second response setting current mirror circuit cooperating with said first control circuit means and said apportionate feed circuit means to establish a response of said output current to said load circuit within said second range.

7. An apparatus for controlling a current supply device for providing a supply current to a load as recited in claim 2 wherein said second control circuit means comprises a second voltage setting current mirror circuit and a second response setting current mirror circuit; said second voltage setting current mirror circuit establishing said higher load level in response to said second reference current; said second response setting current mirror circuit cooperating with said first response setting current mirror circuit and said apportionate feed circuit means to establish a response of said output current to said load circuit within said second range.

* * * * *